United States Patent [19]
Sakai

[11] Patent Number: 6,123,047
[45] Date of Patent: Sep. 26, 2000

[54] ANIMAL CAGE

[75] Inventor: Kozo Sakai, Fukuoka-ken, Japan

[73] Assignee: Kazumi Morita, Hyogo-Ken, Japan

[21] Appl. No.: 09/031,309

[22] Filed: Feb. 26, 1998

[30] Foreign Application Priority Data

Mar. 5, 1997 [JP] Japan ................................. 9-069226

[51] Int. Cl.[7] ................................................ A01K 1/03
[52] U.S. Cl. ...................... 119/452; 119/472; 119/467; 119/481; 119/417
[58] Field of Search ................................ 119/472, 452, 119/416, 475, 467, 481, 459, 417

[56] References Cited

U.S. PATENT DOCUMENTS

| | | | |
|---|---|---|---|
| D. 231,371 | 4/1974 | Willinger et al. ....................... | 119/452 |
| 3,857,364 | 12/1974 | Miller, Jr. ............................. | 119/417 |
| 4,282,829 | 8/1981 | Tweed .................................... | 119/452 |
| 4,651,675 | 3/1987 | Collier .................................. | 119/416 |

*Primary Examiner*—Peter M. Poon
*Assistant Examiner*—Judith A. Nelson
*Attorney, Agent, or Firm*—Dennis T. Griggs

[57] ABSTRACT

The disclosure relates to a cage for small domestic pet animals which provides space saving yet permits ready expansion in the event of pet population growth. The cage is of a hanging-up-on-the-wall type having a relatively small depth and width. It includes a rear wall having a plurality of attachment holes through which many accessories are attached to the rear wall. A plurality of openings are formed in the side walls to receive perforated blind plates for air penetration. The cage may comprise a primary and an auxiliary housing which are connected to each other through a tubular passage.

3 Claims, 3 Drawing Sheets

ANIMAL CAGE

BACKGROUND OF INVENTION (a) Field of the Invention

The present invention relates generally to cages for small domestic pet animals such as, for example, hamsters, gerbils and the like and, more particularly, to an animal cage which is capable of use as a hanging-up-on-the-wall type cage which provides space saving yet permits ready expansion in the event of pet population growth. The invention also relates to various kinds of accessories or means in the animal cage that permit the pet to eat, sleep, excrete waste material and exercise, the accessories being removably mounted to the rear wall of the animal cage.

(b) Description of the Prior Art

As is commonly well known, pet animals of rodent variety, namely hamsters, gerbils, etc., are maintained in various forms of enclosures. For example, hamsters or gerbils are kept in cages made of glass or transparent plastic materials and having an upwardly opening top for ready access into the enclosure.

Normally disposed in such a cage are various accessories, such as a feeder, a waterer and playing or exercising means for animals. The playing or exercising means are needed because animals maintained in such a confined environment become listless, less active, and fail to provide the excitement and novelty for the hobbyst as when originally purchased.

Disadvantageously, these conventional animal cages are generally bulky, namely, they have considerable depth and width because of the large space required to arrange various accessories horizontally on the bottom of the cage. In other words, the conventional type of cage takes up comparatively large space when it is placed on the floor, table or the like. This type of cage is not adaptable to being hung up on the wall because it may project too much from the wall.

Another disadvantage associated with the conventional type of cage is that the cages themselves are autonomous and independent habitats so that they cannot allow ready expansion so as to accommodate future pet population growth. In the event of such pet population growth, it will be necessary to purchase another cage of greater size.

SUMMARY OF THE INVENTION

Accordingly, it is an object of the present invention to provide a novel animal cage or habitat which is capable of use as a hanging-up-on-the-wall type cage which takes up less space for placement.

It is another object of the present invention to provide a novel animal cage or habitat which permits ready expansion in the event of pet population growth.

It is a further object of the present invention to provide an animal cage or habitat in which a plurality of accessories such as a feeder, a waterer, playing or exercising means for animals are arranged vertically on the rear wall of the cage by means of a novel attachment mechanism including a plurality of rotary shafts.

It is a still further object of the present invention to provide a novel rotary shaft for removably attaching an accessory to the rear wall of the cage.

It is a still further object of the present invention to provide a novel animal cage or habitat comprising a primary housing and an auxiliary housing which are connected to each other by means of a tubular passage extending between both housings.

BRIEF DESCRIPTION OF THE DRAWINGS

When the above and additional objects and advantages in view, as will hereinafter appear, this invention comprises the devices, combinations and arrangements of parts hereinafter described and illustrated in the accompanying drawings of a preferred embodiment in which.

DETAILED DESCRIPTION OF THE INVENTION

Figure 1:
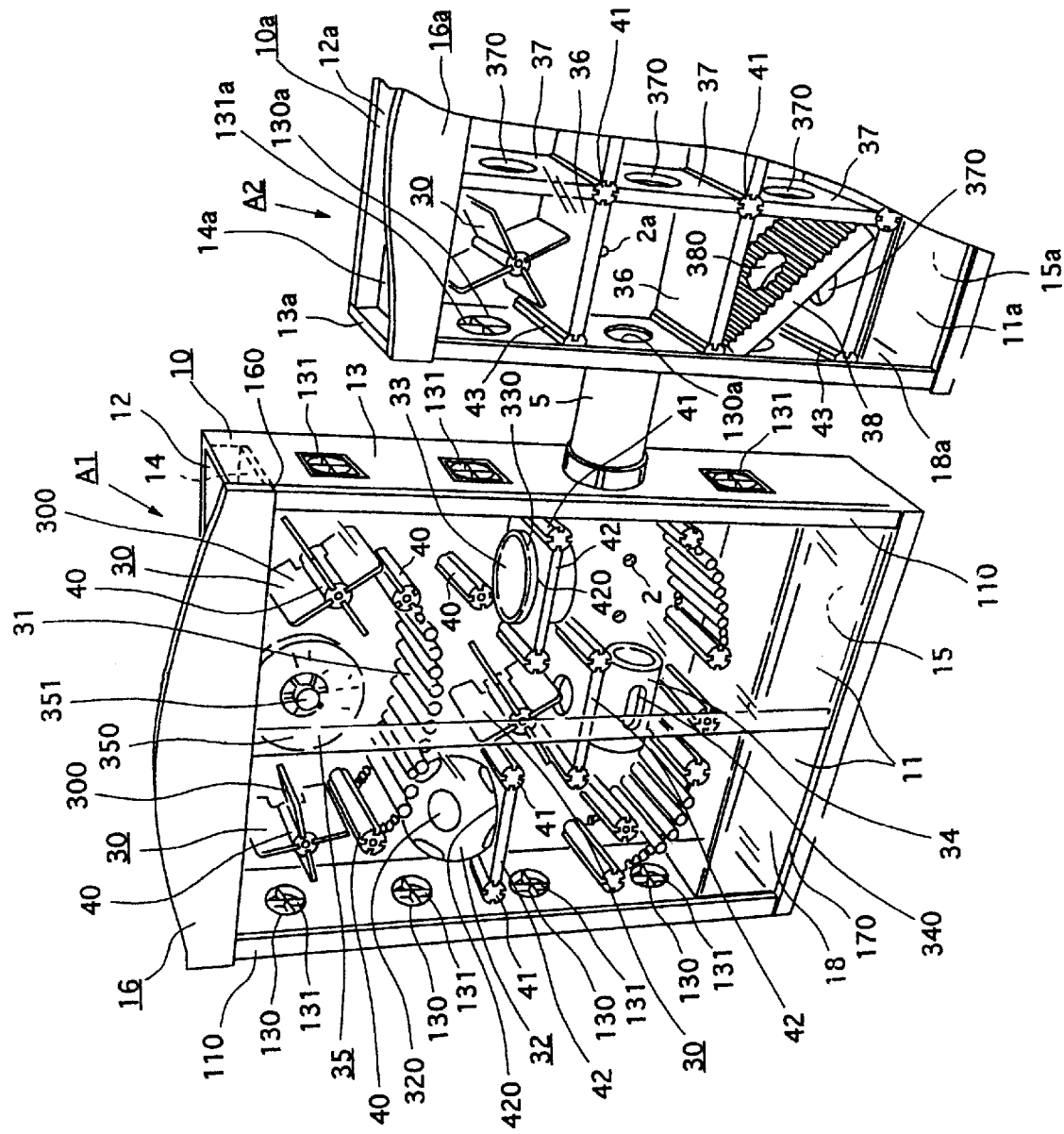
FIG. 1 illustrates a perspective view of an animal cage comprising a primary housing and an auxiliary housing which are connected to each other by a tubular passage so as to provide expanded space for animals.
Figure 2:
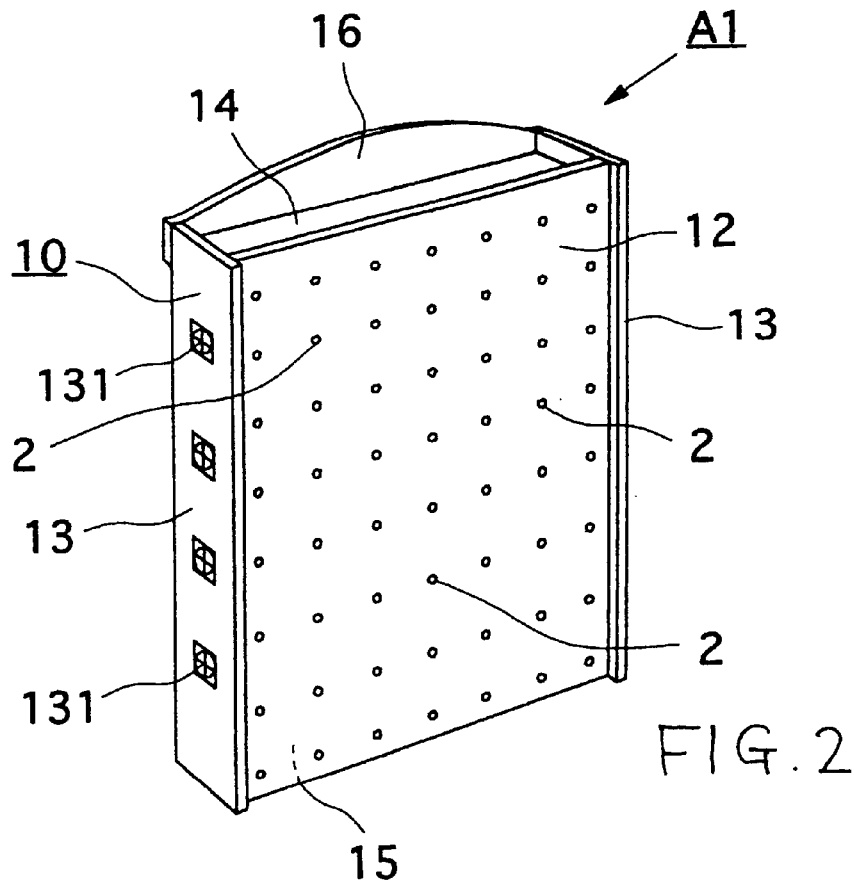
FIG. 2 illustrates a rear view of the primary housing showing a plurality of attachment holes formed in the rear wall thereof.
Figure 3:
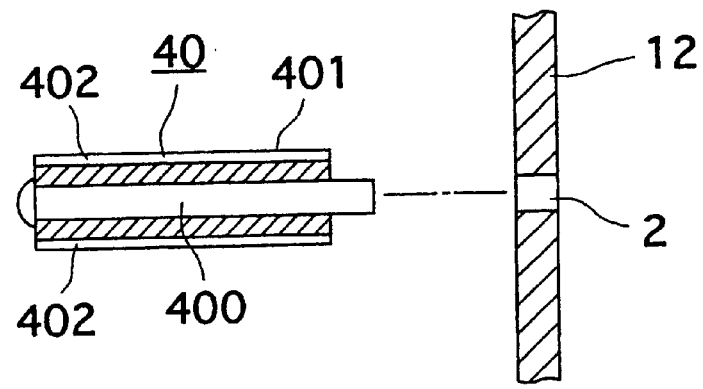
FIG. 3 illustrates a cross-sectional view showing how a rotary shaft is used to removably mount a feeder, a waterer, a playing or exercising means or the like to the rear wall of the housing.

Referring now to the drawings, and more particularly to FIGS. 1–3 thereof, the present invention relates generally to an animal cage or habitat which comprises a primary housing A1, an auxiliary housing A2 and a tubular passage 5 connecting both housings.

The primary housing A1 is generally of a "box" type having an open front portion which is normally closed by a pair of door members 11 which are mounted for sliding movement to permit access into the cage. The primary housing A1 is comprised of a rear wall 12, two side walls 13, a top wall 14 and a bottom wall 15, which can be assembled easily by use of an adhesive material, screws or the like to form an upright box 10. In a preferred embodiment of the invention, these walls 12, 13, 14 and 15 are made of wood but other materials such as plastic, metal or porcelain may be used to constitute the walls. The sliding door members 11 are formed of a transparent plastic material but they may be made of glass or wire mesh.

The top wall 14 and the bottom wall 15 include a pair of downwarly opening guide grooves 160 and a pair of upwardly opening guide grooves 170, respectively. These grooves 160, 170 are formed in the associated walls adjacent to their front ends to receive the upper and lower ends of the door members 11 for sliding movement therealong. A front top plate 16 is rigidly mounted to the front end surfaces of the top and side walls 14, 13 to serve as a displaying or advertising means.

As best shown in FIG. 2, the rear wall 12 has a plurality of equi-spaced attachment holes 2 formed therein which enable attaching of accessories such as a feeder, a waterer and various playing or exercising means thereto. The attachment holes 2 are through holes adapted to receive a rotary shaft such as one designated at 40 in FIG. 3. In the preferred embodiment, the attachment holes 2 are arranged in the rear wall 12 of the housing in eight rows and seven columns to provide flexibility of attachment.

Referring back to FIG. 1, the side walls 13 include a plurality of openings 130 which may be detachably closed by means of blind plates 131. The blind plates 131 are preferably perforated for air penetration. Although not specifically shown, the blind plates 131 which may be formed of a hard plastic material, and the openings 130 have associated conventional bayonet interlocking elements which permit insertion of the plate 131 into the opening 130 and a turning of the plate 131 relative to the opening 130 into a locked or unlocked condition.

Disposed in the primary housing A1 in operative association with the bottom wall 15 is a transparent tray 18 which is adapted to remove waste material or other debris from the housing. The transparent tray 18 preferably holds sawdust, for example. Preferably, the transparent tray 18 may be detached readily from the housing A1 by temporarily removing the door members 11 from the cage.

Each sliding door member 11 has a wooden pull plate 110 attached thereto at its outer end. These pull plates 110 enable one to slide the door members 11 relative to each other along the guide grooves 160, 170 to close or open the front opening of the cage. It is to be noted that other types of doors such as hinged doors can be use in place of such sliding door.

Disposed in the upper portion of the primary housing A1 at generally the same height are two rotary members 30 which serve as playing or exercising means for animals. Each rotary member 30 includes a rotary shaft 40 rotatably mounted to the rear wall 12 through the attachment hole 2, and four planar vanes 300 rigidly mounted to the rotary shaft 40.

As best shown in FIG. 3, the rotary shaft 40 comprises an axle 400 having an enlarged cap, and a cylindrical member 401 through which the axle 400 extends. The cylindrical member 401 has four axially extending channels 402 which are disposed with the planes thereof offset 90 degrees relative to each other to receive the four flat vanes 300 therein.

Disposed in the upper center portion of the primary housing A1 between the two rotary members 30 is a feeder 35 which comprises an axle 351 fixedly attached to the rear wall 12 of the housing and a disc-like feeder 350 rotatably mounted on the axle.

Disposed in the upper center portion of the primary housing A1 but at level just below the feeder 35 is a suspension bridge 31 which is suspended by a pair of spaced rotary shafts 40 attached to the rear wall of the housing. The suspension bridge 31 is comprised of a number of bars and two cables interconnecting these bars.

Disposed in the left center portion of the primary housing A1 is a nesting bowl 32 which serves as playing means. The nesting bowl 32 is a hollow, generally spherical body having a plurality of openings 320 for access into the inside thereof. The nesting bowl 32 is snugly received in a conforming circumferential surface of an opening 420 formed in a pedestal 42 which in turn is horizontally supported by means of two rotary shafts 41 removably attached to the rear wall 12 of the housing.

Disposed in the right center portion of the primary housing A1 is a waterer 33 which comprises an upwardly opening cup-like member snugly received in an opening 330 formed in a pedestal 42. The pedestal 42 is horizontally supported by two rotary shafts 42 removably attached to the rear wall 12 of the housing. The cup member of the waterer 33 may be used as a feeder. A third rotary member 30 is placed between the nesting bowl 32 and the waterer 33.

Disposed in the lower center portion of the primary housing A1 just below the third rotary member 30 is a pedestal 42 which has a tunnel member 34 attached to the underside thereof. The pedestal 42 is horizontally supported by two rotary shafts removably attached to the rear wall of the housing. The tunnel member 34 has a hole extending therethrough and an axially extending oblong opening 340 formed in the wall thereof.

In order to provide added space for pet animals or to cope with pet population growth, the auxiliary housing A2 is used in association with the primary housing A1. The auxiliary housing A2 is also of a "box" type having an open front portion which is normally closed by a pair of similar sliding door members 11a. As shown in broken-away view, the auxiliary housing A2 also comprises a rear wall 12a, two side walls 13a, a top wall 14a and a bottom wall 15a, which can be assembled by using an adhesive material or other fastening means (not shown).

As shown, the auxiliary housing A2 is of a multi-level construction including a plurality of floor panels 36 and a plurality of side panels 37 which are assembled by means of rotary shafts 41 to form a plurality of cells. A plurality of panel support members 43 are also attached to the side wall 13a of the auxiliary housing A2 and include grooves for snugly receiving the ends of the floor panels 36 to support them horizontally. Each side panels 37 has an opening 370 for allowing animals to gain access to neighboring chambers defined by the floor panels 36 and the side panels 37.

Disposed in the lowest chamber just above a transparent tray 18a is a stairway 38 which is secured in the position illustrated between the two floor panels 36 in a conventional manner. The stairway 43 has an opening 380 formed generally centrally thereof.

The tubular passage 5 is made of a transparent plastic material and is used to allow animals to move between the primary housing A1 and the auxiliary housing A2. It is to be noted that the primary housing and the auxiliary housing can be connected to each other just by juxtaposing them without using such tubular passage 5.

Figure 4:
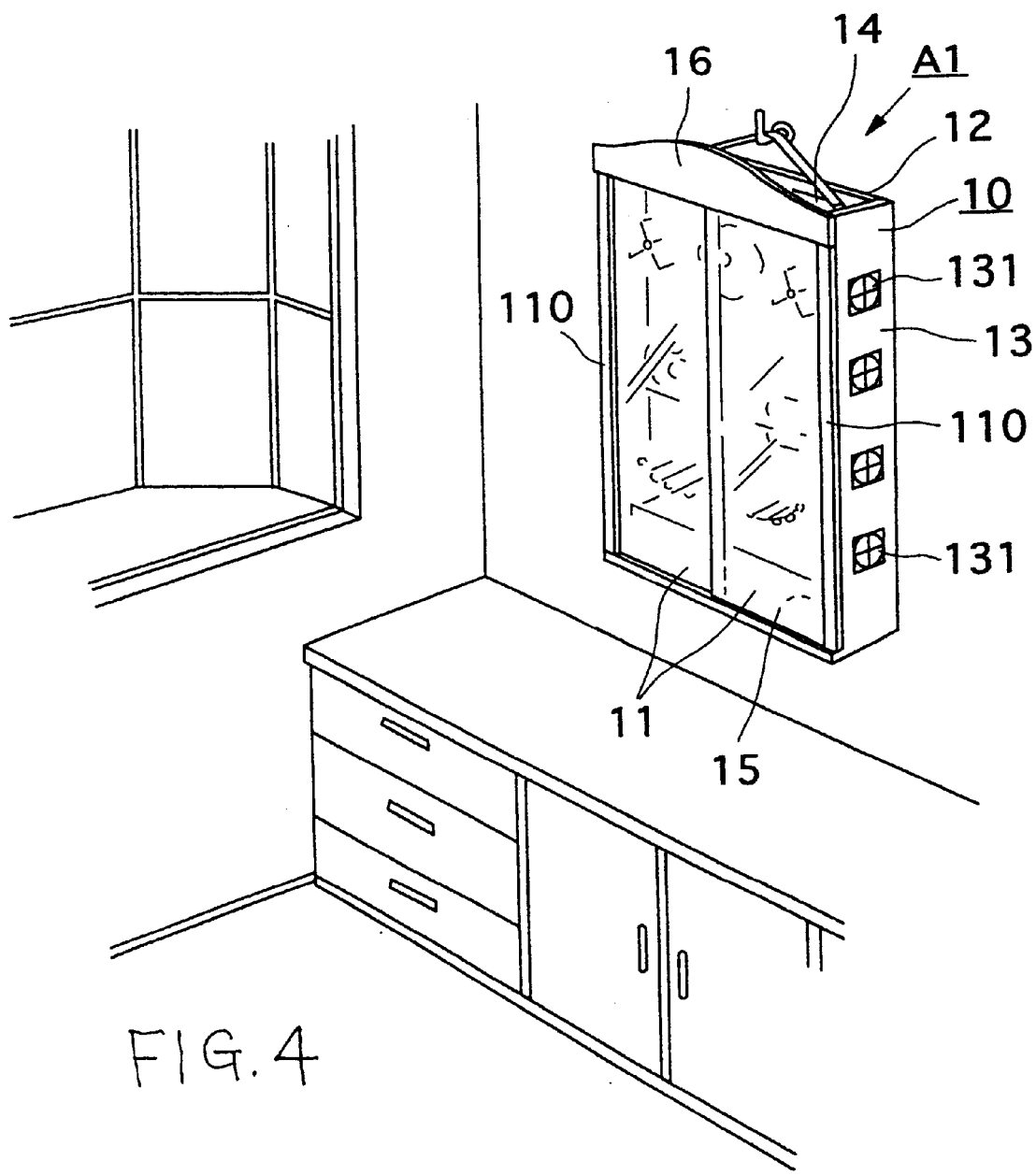
FIG. 4 illustrates a typical manner in which the animal cage or habitat of the present invention is hung up on the wall.

As seen, most of accessories such as the feeder 35, waterer 33, etc. can be mounted to the rear wall 12, 12a of the primary and auxiliary housings A1, A2 by means of the novel rotary attachment mechanism as shown in FIG. 2 and FIG. 3. The fact that these accessories are arranged vertically on the rear wall results in significant savings in the space and depth needed for such animal cages. The animal cage can be hung up on the wall in the manner as shown in FIG. 4.

Also, this removable rotary attachment mechanism provides increased flexibility in the positioning of various accessories on the rear wall of the cage. Removal or replacement of accessories can be effected easily by moving the sliding door to open the front opening of the cage.

The use of tubular passages 5 to connect the auxiliary housing to the primary housing will readily increase the capacity of the cage so that this expandable construction can accommodate increased pet animal population. On the contrary, if the pet population decreases, one or more of such auxiliary housings may well be disconnected from the primary housing.

In keeping up with the foregoing, it is an object of the present invention to provide a novel and improved animal cage which preferably includes but is not limited to the following advantages:

a. The cage can be used as a hanging-up-on-the-wall type cage which provides significant space saving;

b. The novel rotary removable attachment mechanism for various accessories permits positioning of such accessories vertically on the rear wall in a ready manner;

c. The use of the tubular passage makes it easy to add an auxiliary housing to the primary housing so as to accommodate pet animal population growth. It also helps animals to remain active by giving them the opportunities to move between neighboring housings.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A cage for small domestic pet animals, comprising:

a primary housing including a transparent front portion which permits observance therethrough of animals, said primary housing having a rear wall and two side walls, one of said side walls having at least one opening formed therein;

a plurality of accessories which permit the pet animal to eat, sleep, and exercise within said primary housing;

a plurality of attachment means for removably attaching said plurality of accessories to the rear wall of said primary housing so that said accessories are arranged vertically on the rear wall;

an auxiliary housing having two side walls, one of said side walls having at least one opening formed therein;

said primary housing and said auxiliary housing being juxtaposed with each other;

tubular passage means extending between said primary housing and said auxiliary housing to connect them through said openings formed in their side walls; and, each of said plurality of attachment means comprises an attachment hole formed in the rear wall of said primary housing and a rotary member mounted on said rear wall to rotatably support said accessory, said rotary member including an axle inserted into the attachment hole and fixedly attached to the rear wall, said axle extending through said rotary member and supporting said rotary member for rotation.

2. A cage for small domestic pet animals as set forth in claim 1 wherein said rotary shaft comprises an axle having an enlarged cap and a cylindrical member through which the axle extends, said cylindrical member having means for mounting said accessory thereto.

3. A cage for small domestic pet animals as set forth in claim 1 wherein said attachment holes are equi-spaced to form a plurality of rows and columns.

* * * * *